United States Patent [19]

Shirtum et al.

[11] Patent Number: 4,952,647

[45] Date of Patent: Aug. 28, 1990

[54] ALIPHATIC, NON-HYDROLYZABLE CHLORIDE-CONTAINING EPOXY RESINS AND PROCESS FOR THEIR PRODUCTION

[75] Inventors: Robert P. Shirtum, Freeport; Walter Wernli, Angleton, both of Tex.

[73] Assignee: The Dow Chemical Company, Midland, Mich.

[21] Appl. No.: 473,005

[22] Filed: Jan. 31, 1990

Related U.S. Application Data

[62] Division of Ser. No. 258,250, Oct. 14, 1988, abandoned.

[51] Int. Cl.$^5$ .................. C08G 59/06; C08G 59/14
[52] U.S. Cl. .................................. 525/523; 549/559
[58] Field of Search .................................. 549/559

[56] References Cited

U.S. PATENT DOCUMENTS

| | | | |
|---|---|---|---|
| 2,581,464 | 1/1952 | Zech | 549/559 |
| 2,712,000 | 6/1955 | Zech | 549/559 |
| 2,774,691 | 12/1956 | Schroeder | 549/559 |
| 2,903,381 | 9/1959 | Schroeder | 549/559 |
| 3,477,966 | 11/1969 | Doss | 549/559 |

Primary Examiner—Morton Foelak
Assistant Examiner—Frederick Krass

[57] ABSTRACT

Epoxy resins containing aliphatic, non-hydrolyzable chlorine atoms are prepared by hydrochlorinating an epoxy resin thereby forming a chlorohydrin intermediate product; reacting this intermediate product with epichlorohydrin in the presence of a Lewis acid; and dehydrochlorinating the resultant product.

4 Claims, No Drawings

ALIPHATIC, NON-HYDROLYZABLE CHLORIDE-CONTAINING EPOXY RESINS AND PROCESS FOR THEIR PRODUCTION CROSS REFERENCE TO RELATED APPLICATION

This is a divisional of application Ser. No. 258,150, filed Oct. 14, 1988, abandoned, which is incorporated herein by reference in its entirety.

FIELD OF THE INVENTION

The present invention concerns epoxy resins containing aliphatic, non-hydrolyzable chloride and a process for preparing them.

BACKGROUND OF THE INVENTION

For some applications, it is desirable to employ epoxy resins having from about 0.2 to about 10 percent by weight of non-hydrolyzable, aliphatic chlorine atoms. Such applications include, for example, blending with other epoxy resins which contain very low or zero concentrations of non-hydrolyzable, aliphatic chlorine atoms so as to obtain a resin containing a specific amount of non-hydrolyzable, aliphatic chlorine atoms. Since some manufacturing facilities for producing relatively low molecular weight epoxy resins from a bisphenol and an epihalohydrin are operated so as to produce epoxy resins having hydrolyzable and non-hydrolyzable, aliphatic chloride contents as low as possible, these resins are therefore not particularly suited for the aforementioned applications. Therefore, it would be desirable to have available epoxy resins containing relatively high amounts, e.g. from about 0.2 to about 10 percent by weight of aliphatic, non-hydrolyzable aliphatic chlorine atoms and a process for producing these resins. These resins can then be blended with the relatively low non-hydrolyzable, aliphatic chloride-containing resins so as to result in an epoxy resin having the desired amount of non-hydrolyzable aliphatic chloride.

SUMMARY OF THE INVENTION

The present invention pertains to an epoxy resin represented by the following formulas I and II

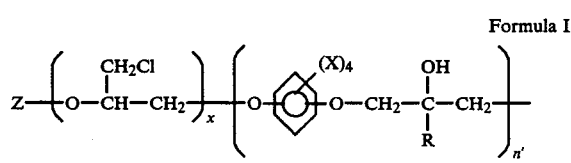

Formula I

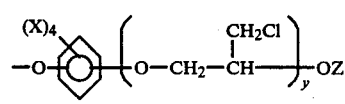

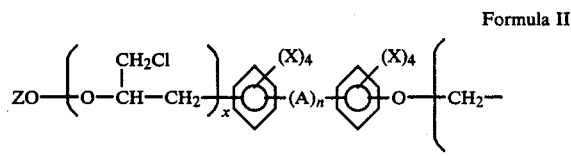

Formula II

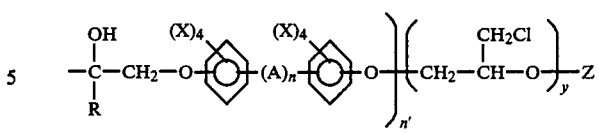

-continued wherein each A is independently a divalent hydrocarbyl group having suitably from 1 to about 12, more suitably from 1 to about 6, most suitably from 1 to about 4, carbon atoms, —O—, —S—, —S—S—, —SO—, —SO$_2$—, or —CO—: each R is independently hydrogen or an alkyl group having from 1 to about 3 carbon atoms: each X is independently hydrogen, a hydrocarbyl or hydrocarbyloxy group having suitably from 1 to about 12, more suitably from 1 to about 6, most suitably from 1 to about 4, carbon atoms or a halogen atom, preferably chlorine or bromine: Z is a group represented by the formula

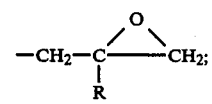

n has a value of zero or 1: n' has an average value from about zero to about 20, suitably from about zero to about 10, more suitably from about zero to about 5, most suitably from about zero to about 3; and x and y each have a value of 1.

Another aspect of the present invention pertains to an epoxy resin mixture comprising (A) an epoxy resin represented by formulas I or II wherein each A is independently a divalent hydrocarbyl group having suitably from 1 to about 12, more suitably from 1 to about 6, most suitably from 1 to about 4, carbon atoms; each R is independently hydrogen or an alkyl group having from 1 to about 3 carbon atoms: each X is independently hydrogen, a hydrocarbyl or hydrocarbyloxy group having suitably from 1 to about 12, more suitably from 1 to about 6, most suitably from 1 to about 4, carbon atoms or a halogen atom, preferably chlorine or bromine;Z is a group represented by the formula

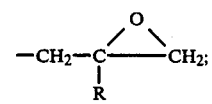

n has a value of zero or 1; n' has an average value from about zero to about 20, suitably from about zero to about 10, more suitably from about zero to about 5, most suitably from about zero to about 3; and x and y each have a value of zero; and (B) an epoxy resin represented by the following formulas III or IV

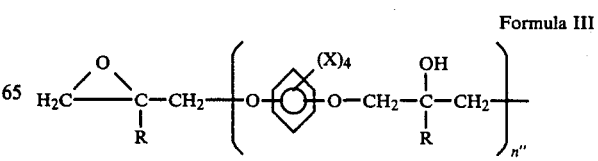

Formula III

-continued

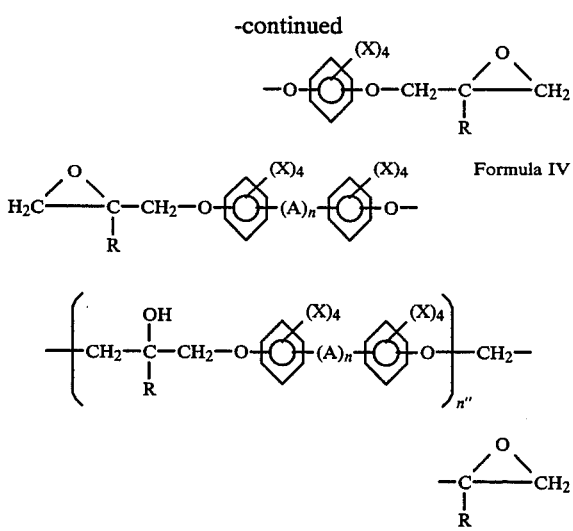

Formula IV wherein each A is independently a divalent hydrocarbyl group having suitably from 1 to about 12, more suitably from 1 to about 6, most suitably from 1 to about 4, carbon atoms; each R is independently hydrogen or an alkyl group having from 1 to about 3 carbon atoms; each X is independently hydrogen, a hydrocarbyl or hydrocarbyloxy group having suitably from 1 to about 12, more suitably from 1 to about 6, most suitably from 1 to about 4, carbon atoms or a halogen atom, preferably chlorine or bromine; n has a value of zero or 1; n'' has an average value from about zero to about 20, suitably from about zero to about 10, more suitably from about zero to about 5, most suitably from about zero to about 3 and wherein components (A) and (B) are present in quantities such that the composition suitably contains from about 0.2 to about 10 , more suitably from about 0.2 to about 8, most suitably from about 0.2 to about 3, percent aliphatic, non-hydrolyzable chloride by weight.

Another aspect of the present invention pertains to a process for the preparation of an epoxy resin represented by formulas I or II wherein each x and y has a value of 1 which process comprises (1) hydrochlorinating an epoxy resin represented by formula III or IV or a combination thereof with a suitable hydrochlorinating agent in the presence of one or more non-reactive solvents at a temperature of from about 0° C. to about 100° C. at a pressure from atmospheric to superatmospheric for from about 0.1 to about 24 hours thereby producing a first chlorohydrin intermediate product;

(2) reacting the resultant chlorohydrin product from step (1) with an epichlorohydrin in an amount which provides a ratio of moles of epichlorohydrin per aliphatic hydroxyl group contained in the first chlorohydrin intermediate product of from about 0.01:1 to about 1:1, in the presence of one or more Lewis acid catalysts and in the presence of one or more non-reactive solvents at a temperature of from about 0° C. to about 100° C. and a pressure from atmospheric to superatmospheric for from about 1 to about 24 hours thereby producing a second chlorohydrin intermediate product;

(3) recovering the second chlorohydrin intermediate product formed in step (2) by any suitable means and dissolving the recovered second chlorohydrin intermediate product in one or more non-reactive solvents and dehydrochlorinating said second chlorohydrin intermediate product with one or more suitable dehydrochlorinating agents at a temperature of from about 10° C. to about 100° C. and a pressure from atmospheric to superatmospheric for from about 1 to about 24 hours employing from about 0.95 to about 1.2 equivalents of dehydrochlorinating agent per mole of chlorohydrin; and (4) recovering the resultant aliphatic, nonhydrolyzable chlorine-containing epoxy resin product.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term hydrocarbyloxy means a hydrocarbyl group having an oxygen linkage between it and the atom to which it is attached.

DETAILED DESCRIPTION OF THE INVENTION

The hydrochlorination reaction can be conducted at temperatures suitably from about 0° C. to about 100° C., more suitably from about 30° C. to about 80° C., most suitably from about 50° C. to about 70° C. At temperatures below about 0° C., the reaction rate is greatly diminished and incomplete conversion to chlorohydrin occurs. At temperatures above about 100° C., a great portion of the HCl boils out of the reaction mixture before reaction can occur, thus causing incomplete reaction to chlorohydrin.

The hydrochlorination reaction can be conducted at pressures suitably from about 1 psia to about 1000 psia, more suitably from about 10 psia to about 100 psia, most suitably from about 14 psia to about 20 psia. At pressures below about 1 psia, the chlorohydrin reaction slows down due to HCl boiling out of the reaction mixture before reaction takes place. If desired, pressures above 1000 psia can be employed although no advantages can be achieved thereby.

The hydrochlorination reaction can be conducted for a period of time suitably from about 0.5 to about 24, more suitably from about 1 to about 10, most suitably from about 2 to about 4, hours. Lower temperatures require longer reaction times whereas higher temperatures require shorter reaction times.

The hydrochlorination reaction can be conducted in the presence of such solvents as alcohols, aromatic hydrocarbons, aliphatic ethers, aromatic ethers, ketones, chlorinated aliphatic hydrocarbons, chlorinated aromatic hydrocarbons any combination thereof and the like. Particularly suitable such solvents include, for example methanol, ethanol, n-propanol, isopropanol, n-butanol, toluene, benzene, xylene, 2-methoxy-1-propanol, methoxy phenol, methylene chloride, 1,2-dichloropropane, dichlorobenzenes, dimethoxyethane, methyl isobutyl ketone, any combination thereof and the like.

Suitable hydrochlorinating agents include, for example, hydrogen chloride, concentrated aqueous hydrochloric acid, commercial bleaches, hypochlorous acid, any combination thereof and the like.

The first intermediate reaction product, the product resulting from the hydrochlorination reaction, can be recovered, if desired, from the reaction mixture prior to reacting it with epichlorohydrin by any suitable means such as, for example, vacuum stripping, rotary evaporation, thin film evaporation, any combination thereof and the like.

The first intermediate reaction product can be reacted with the epichlorohydrin in amounts suitably from about 0.01 to less than about 1, more suitably from about 0.1 to about 0.95, most suitably from about 0.5 to about 0.95 mole of epichlorohydrin per vicinal chlorohydrin group contained in the first intermediate product.

The epichlorohydrin and first intermediate product are reacted at temperatures suitably from about 0° C. to about 100° C., more suitably from about 20° C. to about 80° C., most suitably from about 30° C. to about 50° C. At temperatures below about 0° C., the reaction occurs slowly, until the exotherm takes over and then the reaction could be violent due to excess unreacted epichlorohydrin in the mixture. At temperatures above about 100° C., the reaction is very fast, very exothermic and unless the temperature is below the boiling point of epichlorohydrin, epichlorohydrin is boiled out before reaction can occur.

The reaction between the epichlorohydrin and first intermediate product can be conducted at pressures suitably from about 1 psia to about 1000 psia, more suitably from about 10 psia to about 100 psia, most suitably from about 14 psia to about 20 psia. At pressures below about 1 psia, epichlorohydrin boils out of the reaction mixture before reaction can occur If desired, pressures above 1000 psia can be employed although there is no particular advantage in doing so.

The reaction between the epichlorohydrin and first intermediate product can be conducted for a period of time suitably from about 0.5 to about 24, more suitably from about 1 to about 12, most suitably from about 1 to about 4 hours. Lower temperatures require longer reaction times whereas higher temperatures require shorter reaction times.

The reaction between the epichlorohydrin and first intermediate product can be conducted in the presence of, as a catalyst, any Lewis acid such as, for example, stannic chloride, boron trifluoride etherate, boron trifluoride, stannous chloride, aluminum chloride, any combination thereof and the like.

The reaction between the epichlorohydrin and first intermediate product can be conducted in the presence of such solvents as alcohols, aromatic hydrocarbons, aliphatic ethers, aromatic ethers, polyethers, chlorinated aliphatic hydrocarbons, chlorinated aromatic hydrocarbons, ketones any combination thereof and the like. Particularly suitable such solvents include, for example methanol, ethanol, n-propanol, isopropanol, n-butanol, toluene, benzene, xylene, 2-methoxy-1-propanol, dimethoxy ethane, methoxy benzene, 1,2-dichloropropane, methylene chloride, dichlorobenzenes, dimethoxypropanes, methyl isobutyl ketone, any combination thereof and the like.

The product resulting from reacting the epichlorohydrin and first intermediate product can be recovered, if desired, from the reaction mixture prior to dehydrochlorination by any suitable means such as, for example, vacuum stripping, rotary evaporation, thin film evaporation, any combination thereof and the like.

The product resulting from reacting the epichlorohydrin and first intermediate product can be dehydrochlorinated with any suitable dehydrochlorination agent such as any suitable basic-acting compound such as, for example, alkali metal hydroxides, alkaline earth metal hydroxides, alkali metal carbonates, alkaline earth metal carbonates, alkali metal bicarbonates, alkaline earth metal bicarbonates, any combination thereof and the like. Particularly suitable dehydrochlorination agents include, for example, sodium hydroxide, potassium hydroxide, lithium hydroxide, sodium bicarbonate, potassium bicarbonate, lithium bicarbonate, any combination thereof and the like.

The dehydrochlorination agent is employed in amounts which provide a ratio of moles of dehydrochlorination agent to moles of chlorohydrin suitably from about 0.95:1 to about 1.1:1, more suitably from about 0.96:1 to about 1:1, most suitably from about 0.98:1 to about 1:1. At ratios below about 0 95:1, the hydrolyzable chlorine content rises above about 500 parts per million which for many applications is unacceptable. At ratios above about 1.1:1, oligomer coupling occurs which dramatically increases the viscosity of the product thus making it unsuitable or undesirable for many uses.

The dehydrochlorination reaction can be conducted at temperatures suitably from about 10° C. to about 100° C., more suitably from about 30° C. to about 90° C., most suitably from about 60° C. to about 80° C. At temperatures below about 10° C., the reaction is very slow, caustic solutions freeze upon contact with the "cold" reaction mixture and fallout as solids and may not participate in the dehydrochlorination reaction. At temperatures above about 100° C., excess side reactions occur which produce undesirable by-products.

The dehydrochlorination reaction can be conducted at pressures suitably from about 0.1 psia to about 14 psia, more suitably from about 1 psia to about 12 psia, most suitably from about 2 psia to about 4 psia. At pressures below about 0.1 psia, reaction temperatures must be low to use 0.1 psia pressure and the reaction is slow. At pressures above about 5 psia, too much residual water remains in the reaction mixture thus causing undesirable side reactions to occur which produces undesirable by-products.

The dehydrochlorination reaction can be conducted for a period of time suitably from about 0.5 to about 24, more suitably from about 1 to about 12, most suitably from about 1 to about 4, hours. Lower temperatures require longer reaction times whereas higher temperatures require shorter reaction times.

The dehydrochlorination reaction can be conducted in the presence of such solvents as alcohols, aromatic hydrocarbons, aliphatic ethers, aromatic ethers, polyethers, ketones, chlorobenzenes, chlorinated epoxides, any combination thereof and the like. Particularly suitable such solvents include, for example methanol, ethanol, n-propanol, isopropanol, n-butanol, toluene, benzene, xylene, methyl isobutyl ketone, 2-ethoxy-1-propanol, dimethoxy ethane, dimethoxypropane, trimethoxypropane, dichlorobenzenes, methylene chloride, acetone, methyl ethyl ketone, epichlorohydrin, any combination thereof and the like.

The product resulting from dehydrochlorinating the reaction product obtained from reacting the epichlorohydrin and first intermediate product can be recovered from the reaction mixture by any suitable means such as, for example, vacuum stripping, rotary evaporation, thin film evaporation, or any combination thereof and the like.

The reaction between the first intermediate product and the epichlorohydrin and dehydrochlorination of the resultant product can be conducted by the procedures disclosed by Wang et al. in U. S. Pat. No.

4,499,255 which is incorporated herein by reference in its entirety.

The chlorinated epoxy resins of the present invention can be cured with any suitable curing agent for epoxy resins including, for example, aliphatic or aromatic primary and secondary polyamines, carboxylic acids and anhydrides thereof, phenolic hydroxyl-containing compounds, guanidines, biguanides, urea-aldehyde resins, melamine-aldehyde resins, alkoxylated urea-aldehyde resins, alkoxylated melamine-aldehyde resins, combinations thereof and the like. Particularly suitable curing agents include, for example, diethylenetriamine, diethylenetetramine, diamino cyclohexane, methylenedianiline, maleic anhydride, combinations thereof and the like. The curing agents are employed in an amount which will effectively cure the composition containing the chlorinated epoxy resin. These amounts will depend upon the particular modified epoxy resin and curing agent employed. The *Handbook of Epoxy Resins* by Lee and Neville, McGraw-Hill, 1967 contains various discussions concerning the curing of epoxy resins as well as compilation of suitable curing agents. This handbook is incorporated herein by reference in its entirety.

The compositions of the present invention containing epoxy resins and curing agents can be cured at any suitable temperature which will cause the reactants to become thermoset, i.e. insoluble and infusable. Different curing agents will require different temperatures and cure schedules.

The chlorinated epoxy resins of the present invention can be blended with other materials such as solvents or diluents, fillers, pigments, dyes, flow modifiers, thickeners, reinforcing agents, surfactants, combinations thereof and the like.

Solvents or diluents which can be employed herein include, for example, aliphatic hydrocarbons, ketones, glycol ethers, aromatic hydrocarbons, chlorinated aliphatic hydrocarbons, chlorinated aromatic hydrocarbons, aliphatic ethers, aromatic ethers, combinations thereof and the like. Particularly suitable solvents or diluents include, for example, toluene, benzene, xylene, methyl ethyl ketone, methyl isobutyl ketone, diethylene glycol methyl ether, dipropylene glycol methyl ether, dimethoxy ethane, dimethoxy propane, methoxy benzene, acetone, methylene dichloride, dichlorobenzenes, combinations thereof and the like.

The following examples are illustrative of the invention, but are not intended to limit the scope thereof in any manner.

EXAMPLE 1

A mixture of 400 grams (1.18 equiv.) of liquid epoxy resin (a diglycidyl ether of bisphenol A having an epoxide equivalent weight, EEW, of 185 and 0.02 weight % hydrolyzable chlorine and 0.14%, by weight, bound chlorine), 400 grams of toluene, 50 grams of water and 50 grams of methanol are mixed together at 60° C. until an emulsion forms. Concentrated HCl (37% by weight in water) is titrated into the mixture at a rate of 0.5 cc per minute for five minutes, or until a 2° C. exotherm is observed. The HCl feed is intermittently terminated until the reaction temperature drops back to 50° C., then HCl titration is resumed. This process is repeated until all the epoxy groups are hydrochlorinated, and the resin species are primarily in the dichlorohydrin form.

The resin is stripped free of water, methanol, toluene and HCl on a rotary evaporator at 185° C. and pressure of 2 mm Hg (abs.) for two hours. The pure resin is dissolved in toluene to 30% resin (by weight) and 1.06 grams of stannic chloride ($SnCl_4$) is added to the mixture as a coupling catalyst. Epichlorohydrin is titrated into the reaction mixture until a total of 104 grams are in the reaction. The reaction time is 2.5 hours. A 15 minute digest time is added for a total of 2.75 hours; then the mixture is water washed to remove $SnCl_4$ catalyst. The reaction temperature is maintained below 60° C. and above 40° C. using the reaction exotherm.

The resulting reaction solution is once again rotary evaporated to remove volatiles and solvents.

The pure neat resin is dissolved in 1000 grams of a mixture of 90% epichlorohydrin and 10% propylene glycol methyl ether, and epoxidized at 65° C. and 200 mm Hg (abs.) pressure using 158.0 grams of 50% aqueous NaOH solution over a two hour time period.

The resulting solid salt phase from the epoxidation is filtered from the resin solution and discarded. The resin solution is washed with 200 mls of deionized water and rotary evaporated as before until pure resin is obtained.

The final resin product contains 450 ppm hydrolyzable chlorides and 2.17% (by weight) bound (non-hydrolyzable, aliphatic) chlorine. The theoretical amount of bound (non-hydrolyzable, aliphatic) chlorine for this example, which corresponds to formula II wherein A is an isopropylidine group, R is H, X is H, n has a value of 1 and n' has a value of 1, is 9.98 % by weight.

EXAMPLE 2

A mixture of 340.2 grams (1 equiv.) of liquid epoxy resin (a diglycidyl ether of bisphenol A having an epoxide equivalent weight, EEW, of 185 and 0.02 weight % hydrolyzable chlorine and 0.14 %, by weight, bound chlorine), 400 grams of toluene, 50 grams of water and 50 grams of methanol are mixed together at 30° C. until an emulsion forms. Concentrated HCl (37% by weight in water) is titrated into the mixture at a rate of 0.5 cc per minute for five minutes, or until a 2° C. exotherm is observed. The HCl feed is intermittently terminated until the reaction temperature drops back to 30° C., then HCl titration is resumed. This process is repeated until all the epoxy groups are hydrochlorinated, and the resin species are primarily in the dichlorohydrin form. A total of 183.6 grams of 37% HCl is used.

The resin is stripped free of water, methanol, toluene and HCl on a rotary evaporator at 185° C. and pressure of 2 mm Hg (abs.) for two hours. The pure resin (413 grams) is dissolved in toluene to 30% resin (by weight) and 2 grams of stannic chloride ($SnCl_4$) is added to the mixture as a coupling catalyst. Epichlorohydrin is titrated into the reaction mixture until a total of 148 grams are in the reaction. The reaction time is 2.5 hours. A 15 minute digest time is added for a total of 2.75 hours; then the mixture is water washed to remove $SnCl_4$ catalyst. The reaction temperature is maintained below 60° C. and above 40° C. using the reaction exotherm.

The resulting reaction solution is once again rotary evaporated to remove volatiles and solvents.

The pure neat resin is dissolved in 1000 grams of a mixture of 90% epichlorohydrin and 10% propylene glycol methyl ether, and epoxidized at 65° C. and 200 mm Hg (abs.) pressure using 158.0 grams of 50% aqueous NaOH solution over a two hour time period.

The resulting solid salt phase from the epoxidation is filtered from the resin solution and discarded. The resin solution is washed three times with 200 mls of deionized water, phase separated and rotary evaporated as before until pure resin is obtained.

The final resin product contains 358 ppm hydrolyzable chlorides and 9.4% (by weight) bound (nonhydrolyzable, aliphatic) chlorine. The theoretical amount of bound (non-hydrolyzable, aliphatic) chlorine for this example, which corresponds to formula II wherein A is an isopropylidine group, R is H, X is H, n has a value of 1 and n' has a value of 1, is 9.98 % by weight.

What is claimed is:

1. A process for the preparation of an epoxy resin represented by the following formulas I or II $$Z\text{---}\left(\text{O---}\underset{\underset{x}{\mathrm{CH_2Cl}}}{\mathrm{CH}}\text{---}\mathrm{CH_2}\right)_x\left(\text{O---}\underset{(X)_4}{\bigcirc}\text{---O---CH_2---}\underset{\underset{R}{\mathrm{OH}}}{\mathrm{C}}\text{---CH_2}\right)_{n'}$$

Formula I $$\underset{(X)_4}{\text{---O}\bigcirc}\left(\text{O---CH_2---}\underset{\underset{\mathrm{CH_2Cl}}{}}{\mathrm{CH}}\right)_y\text{---OZ}$$

Formula II

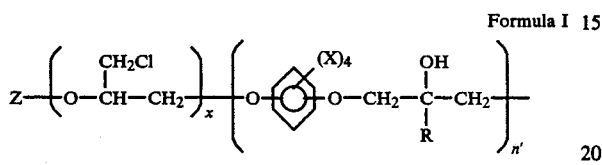

wherein each A is independently a divalent hydrocarbyl group having from 1 to about 12 carbon atoms, —O—, —S—, —S—S—, —SO—, —SO₂—, or —CO—; each R is independently hydrogen or an alkyl group having from 1 to about 3 carbon atoms; each X is independently hydrogen, a hydrocarbyl or hydrocarbyloxy group having from 1 to about 12 carbon atoms or a halogen atom; Z is a group represented by the formula $$-\mathrm{CH_2}-\underset{\underset{R}{|}}{\mathrm{C}}\underset{\diagdown}{\overset{\diagup \mathrm{O} \diagdown}{\vphantom{|}}}\mathrm{CH_2};$$

n has a value of zero or 1; n' has an average value from zero to about 20; and x and y each have a value of 1; which process comprises (1) hydrochlorinating an epoxy resin represented by the following formulas III or IV or a combination thereof Formula III wherein each A is independently a divalent hydrocarbyl group having from 1 to about 12 carbon atoms; each R is independently hydrogen or an alkyl group having from 1 to about 3 carbon atoms; each X is independently hydrogen, a hydrocarbyl or hydrocarbyloxy group having from 1 to about 12 carbon atoms or a halogen atom; n has a value of zero or 1; n" has an average value from zero to about 20; with a suitable hydrochlorinating agent in the presence of one or more non-reactive solvents at a temperature of from about 0° C. to about 100° C. at a pressure from atmospheric to superatmospheric for from about 0.5 to about 24 hours thereby producing a first chlorohydrin intermediate product;

(2) reacting the resultant chlorohydrin product from step (1) with from about 0.01 to less than about 1 mole of of epichlorohydrin per mole of chlorohydrin in said first chlorohydrin intermediate product in the presence of one or more Lewis acid catalysts and in the presence of one or more non-reactive solvents at a temperature of from about 0° C. to about 100° C. and a pressure from atmospheric to superatmospheric for from about 0.5 to about 24 hours thereby producing a second chlorohydrin intermediate product;

(3) recovering the second intermediate product formed in step (2) by any suitable means and dissolving the recovered second chlorohydrin intermediate product in one or more non-reactive solvents and dehydrochlorinating said second chlorohydrin intermediate product with one or more suitable dehydrochlorinating agents at a temperature of from about 30° C. to about 90° C. and a pressure from about 0.1 psia to about 14 psia for from about 0.5 to about 24 hours employing from about 0.95 to about 1.1 equivalents of dehydrochlorinating agent per mole of chlorohydrin; and (4) recovering the resultant aliphatic, non-hydrolyzable chlorine-containing epoxy resin product.

2. A process of claim 1 wherein (a) the product being prepared is represented by formula II and the epoxy resin being hydrochlorinated is represented by formula IV wherein each A is independently a divalent hydrocarbyl group having from 1 to about 6 carbon atoms, —O—, —S—, —S—S—, —SO—, —SO₂—, or —CO—; each R is independently hydrogen or an alkyl group having from 1 to about 3 carbon atoms; each X is independently hydrogen, a hydrocarbyl or hydrocarbyloxy group having from 1 to about 6 carbon atoms, chlorine or bromine; n has a value of 1; n' has an average value from zero to about 10; and n" has an average value from zero to about 10;
- (b) step (1) conducted at a temperature of from about 30° C. to about 80° C., at a pressure of from about 10 psia. to about 100 psia., for from about 1 hour to about 10 hours;
- (c) step (2) is conducted at a temperature of from about 20° C. to about 80° C., at a pressure of from about 10 psia. to about 100 psia., for from about 1 hour to about 12 hours and the ratio of moles of epichlorohydrin to chlorohydrin is from about 0.1:1 to about 0.95:1:
- (d) dehydrohalogenation in step (3) is conducted at a temperature of from about 30° C. to about 90° C., at a pressure of from about 1 psia. to about 12 psia., for from about 1 hours to about 12 hours; and
- (e) the amount of dehydrochlorinating agent is from about 0.96 to about 1 mole of dehychlorinating agent per mole of chlorohydrin.

3. A process of claim 2 wherein
- (a) each A is independently a divalent hydrocarbyl group having from 1 to about 4 carbon atoms; each R is hydrogen; each X is independently hydrogen, a hydrocarbyl or hydrocarbyloxy group having from 1 to about 4 carbon atoms; n' has an average value from zero to about 5; and n" has an average value from zero to about 5;
- (b) step (1) conducted at a temperature of from about 50° C. to about 70° C., at a pressure of from about 10 psia. to about 100 psia., for from about 1 hour to about 10 hours;
- (c) step (2) is conducted at a temperature of from about 50° C. to about 70° C., at a pressure of from about 14 psia. to about 20 psia., for from about 2 hours to about 4 hours and the molar ratio of epichlorohydrin to chlorohydrin is from about 0.5 to about 0.95;
- (d) dehydrochlorination in step (3) is conducted at a temperature of from about 50° C. to about 70° C., at a pressure of from about 1 psia. to about 4 psia., for from about 1 hour to about 4 hours;
- (e) the amount of dehydrochlorinating agent is from about 0.98 to about 1 mole of dehychlorinating agent per mole of chlorohydrin;
- (f) the solvent employed in step 1 is an alcohol or aromatic hydrocarbon or a combination thereof;
- (g) the solvent employed in step (2) is an aromatic hydrocarbon;
- (h) the solvent employed in step (3) is a mixture of epichlorohydrin and a glycol ether; and
- (i) the dehydrochlorinating agent employed in step (3) is an alkali metal hydroxide.

4. A process of claim 3 wherein
- (a) in formulas II and IV, each A is an isopropylidine group and each n' and n" independently has an average value of from zero to about 3;
- (b) the hydrochlorinating agent is hydrogen chloride;
- (c) the solvent employed in the hydrochlorination step (1) is a mixture of toluene and methanol;
- (d) the coupling reaction, step (2), is conducted in the presence of stannic chloride as the catalyst;
- (e) the solvent employed in step (2) is toluene;
- (f) the solvent employed in the dehydrohalogenation reaction, step (3) is a mixture of epichlorohydrin and propylene glycol methyl ether; and
- (g) the dehydrohalogenation agent is sodium hydroxide.

* * * * *